(12) United States Patent
Han et al.

(10) Patent No.: US 9,036,462 B2
(45) Date of Patent: May 19, 2015

(54) INTERNET GROUP MANAGEMENT PROTOCOL VERSION THREE FOR QUALITY OF SERVICE SUPPORT

(75) Inventors: Lin Han, San Jose, CA (US); Renwei Li, Fremont, CA (US)

(73) Assignee: Futurewei Technologies, Inc., Plano, TX (US)

(*) Notice: Subject to any disclaimer, the term of this patent is extended or adjusted under 35 U.S.C. 154(b) by 254 days.

(21) Appl. No.: 13/531,256

(22) Filed: Jun. 22, 2012

(65) Prior Publication Data
US 2012/0327759 A1   Dec. 27, 2012

Related U.S. Application Data

(60) Provisional application No. 61/499,985, filed on Jun. 22, 2011.

(51) Int. Cl.
  *H04L 12/761* (2013.01)
  *H04L 12/801* (2013.01)
  *H04L 12/815* (2013.01)
  *H04L 12/819* (2013.01)
  *H04L 12/851* (2013.01)

(52) U.S. Cl.
  CPC .............. *H04L 47/15* (2013.01); *H04L 47/22* (2013.01); *H04L 47/21* (2013.01); *H04L 47/2425* (2013.01); *H04L 47/2408* (2013.01)

(58) Field of Classification Search
  None
  See application file for complete search history.

(56) References Cited

U.S. PATENT DOCUMENTS

| 7,411,916 | B2 * | 8/2008 | Sakov et al. | 370/252 |
| 8,085,791 | B1 * | 12/2011 | Aggarwal et al. | 370/400 |
| 8,144,628 | B2 * | 3/2012 | Previdi et al. | 370/256 |

FOREIGN PATENT DOCUMENTS

EP   1968251 A1   9/2008

OTHER PUBLICATIONS

A QoS-Aware Routing Framework for PIM-SM Based IP-Multicast, Biswas et al., Jun. 25, 1999.*
Adams, A., et al., "Protocol Independent Multicast-Dense Mode (PIM-DM): Protocol Specification (Revised)," RFC 3973, Jan. 2005, 61 pages.

(Continued)

*Primary Examiner* — Alex Skripnikov
(74) *Attorney, Agent, or Firm* — Conley Rose, P.C.; Grant Rodolph; Brandt D. Howell (57) ABSTRACT

The disclosure includes a method comprising: receiving, by a first network element, a first communication from a client device, wherein the first communication comprises a multicast channel membership query report and QoS data. The disclosure also includes a method comprising: receiving, by a first network element, a first communication from a client device, wherein the first communication comprises a multicast channel membership query report and QoS data. The disclosure also includes an apparatus comprising: a client device connected to a network element and a network via the first network element, wherein the client device is configured to send a multicast channel membership report indicating the client device wishes to receive a multicast channel communication and indicating requested QoS data relating to the multicast channel communication.

20 Claims, 9 Drawing Sheets

(56) References Cited

OTHER PUBLICATIONS

Fenner, B., et al., "Protocol Independent Multicast-Sparse Mode (PIM-SM): Protocol Specification (Revised)," RFC 4601, Aug. 2006, 112 pages.

Bhattacharyya, S., Ed., "An Overview of Source-Specific Multicast (SSM)," RFC 3569, Jul. 2003, 15 pages.

Handley, M., et al., "Bidirectional Protocol Independent Multicast (BIDIR-PIM)," RFC 5015, Oct. 2007, 44 pages.

Boers, A., et al., "The Protocol Independent Multicast (PIM) Join Attribute Format," RFC 5384, Nov. 2008, 11 pages.

Vida, R., Ed., et al., "Multicast Listener Discovery Version 2 (MLDv2) for IPv6," RFC 3810, Jun. 2004, 63 pages.

Cain, B., et al., "Internet Group Management Protocol, Version 3," RFC 3376, Oct. 2002, 54 pages.

Foreign Communication From A Counterpart Application, PCT Application No. PCT/US2012/043840, International Search Report mailed Sep. 27, 2012, 3 pages.

Foreign Communication From A Counterpart Application, PCT Application No. PCT/US2012/043840, Written Opinion mailed Sep. 27, 2012, 8 pages.

Bianchi, G., et al., "MultiGRIP: Quality of Service Aware Multicasting over DiffServ," Internet Engineering Task Force, Internet Draft, draft-bianchi-qos-multicast-over-diffserv-00.txt, Dec. 2002, 19 pages.

\* cited by examiner

| Addr Family | Encoding Type | Reserved | S | W | R | Mask Len | | 701 |
|---|---|---|---|---|---|---|---|---|
| Source Address | | | | | | | | |
| F | E | Attr_Type | QoS Data Length | Reserved | N | F | | 702 |
| Unicast address of network management server | | | | | | | | |
| QoS OptionType | QoS OptionLength | QoS OptionValue | | | | | | |
| QoS Option Value ... | | | | | | | | 703 |
| . . . | | | | | | | | |
| QoS OptionType | QoS OptionLength | QoS OptionValue | | | | | | |
| QoS Option Value ... | | | | | | | | |
| F | E | Attr_Type | Length | Value | | | | 704 |

| PIM Ver | Type | U | F | Err code | Checksum |
|---|---|---|---|---|---|
| QoS failed Group Address | | | | | |
| QoS failed Source Address | | | | | |
| QoS failed PIM link Address | | | | | |

INTERNET GROUP MANAGEMENT PROTOCOL VERSION THREE FOR QUALITY OF SERVICE SUPPORT

CROSS-REFERENCE TO RELATED APPLICATIONS

The present application claims further priority to U.S. Provisional Patent Application No. 61/499,985 filed Jun. 22, 2011 by Lin Han and Renwei Li, and entitled "Method to Extend Internet Group Management Protocol Version Three for Quality of Service Support", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Protocol Independent Multicast (PIM) is a family of network routing protocols that provide one-to-many and many-to-many distribution of data over Internet Protocol (IP) networks. PIM may allow data to be transmitted from a first hop router (FHR), which is connected to a source or a rendezvous point (RP), to a last hop router (LHR), which is connected to client device. A client device may exchange data with a LHR using Internet Group Management Protocol (IGMP) in an IP version four (IPv4) network or Multicast Listener Discovery (MLD) in an IP version six (IPv6) network. IGMP and MLD may be best effort protocols that do not offer quality of service (QoS) guarantees from a client device to a LHR.

SUMMARY

In one embodiment, the disclosure includes a method comprising: receiving, by a first network element, a first communication from a client device, wherein the first communication comprises a multicast channel membership query report and QoS data.

In another embodiment, the disclosure includes a method comprising: receiving, by a first network element, a first communication from a client device, wherein the first communication comprises a multicast channel membership query report and QoS data.

In yet another embodiment, the disclosure includes an apparatus comprising: a client device connected to a network element and a network via the first network element, wherein the client device is configured to send a multicast channel membership report indicating the client device wishes to receive a multicast channel communication and indicating requested QoS data relating to the multicast channel communication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is an apparatus, system, and method of transmitting QoS data from a client device to a multicast network element, such as a LHR, using a multicast channel membership query report message, such as an IGMP version three (IGMPv3) membership query report message and/or a MLD version two (MLDv2) membership query report message. The QoS data may be used for multicast QoS provisioning in multicast networks, such as PIM networks. A LHR may send a multicast channel membership query, such as an IGMP and/or MLD membership query, to the client device. The client device may respond with a multicast channel membership query report message comprising QoS data indicating requested end to end QoS provisioning for a related downstream multicast communication. The QoS data may be located in an auxiliary data section of the messages group record. The LHR may use the multicast channel membership query report message to populate and/or update a multicast forwarding information database (MFIB), provision local resources to provide multicast QoS, and send a PIM join message comprising the QoS data toward a rendezvous point (RP) or a multicast source. If the LHR receives a PIM QoS fail message, the LHR may notify any related client device(s) and/or a network management device. The LHR may release provisioned resources in case of a PIM QoS fail, a network link failure, and/or when a client device no longer wishes to receive a related multicast communication.

Figure 1:
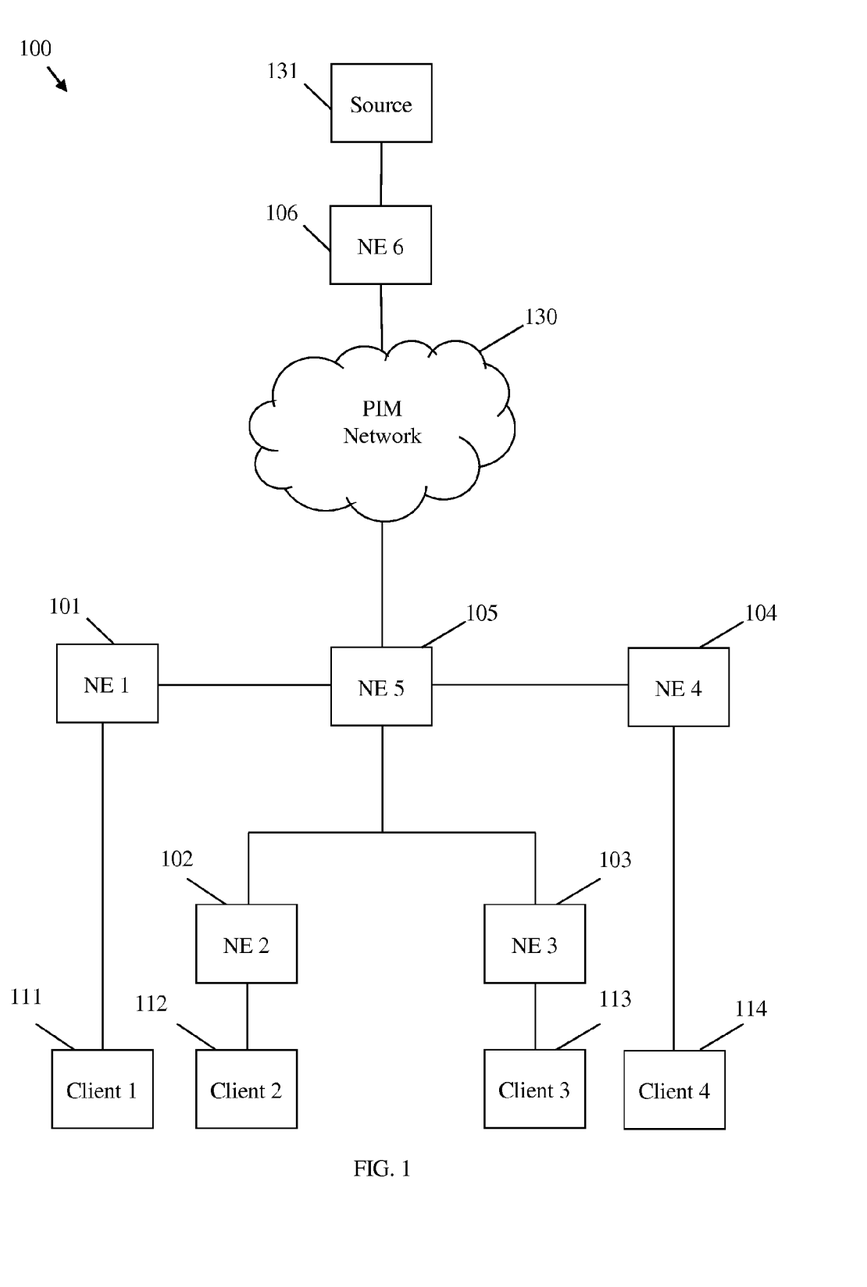
FIG. 1 is a schematic diagram of an embodiment of a network with NEs capable of employing PIM.

FIG. 1 is a schematic diagram of an embodiment of a network 100 capable of employing PIM. The network 100 comprises a source device 131 capable of sending data to and receiving data from client devices 111, 112, 113, and 114. The source device 131 may be connected to the client devices 111-114 through a plurality of NEs 101-106 and a PIM network 130. Specifically, the source device 131 may be connected to NE 106, which may be connected to the PIM network 130. NE 105 may connect NEs 101-104 to the PIM network 130. Client devices 111-114 may be connected to NEs 101-104, respectively. It should be understood that NEs 101-106 may be part of PIM network 130 and are shown for purposes of clarity. Each connection and/or interface between two NEs may be a PIM enabled connection/interface. Each connection and/or interface between a NE and a client device may be an IGMP/MLD enabled connection/interface. The connection/interfaces between source device 131 and NE 106 may be enabled for IGMP, MLD, PIM, or any other suitable transmission protocol.

The source device 131 may be a machine capable of transmitting data to and receiving data from client devices over an IP network, such as an internet content provider. Each NE may be a multicast router, or similar device, configured to receive, transmit, and/or process information using PIM channels denoted (S, G) and/or (*, G) where S denotes the IP address of a single source device, such as source device 131, G denotes the IP addresses of all NEs/client devices in a group that have requested data from the source, and * denotes the IP addresses of all source devices transmitting to G including any source device 131 and any source devices that may be located in the PIM network 130. Specifically, a NE may receive a communication from a source, sources, or an upstream NE, replicate the communication as needed, and transmit the communication to downstream NEs or client devices that wish to receive the communication. Each client device 111-114 may be capable of requesting and receiving data from the source device 131. Each client device 111-114 may be a single computer and/or server, a plurality of computers/servers connected by one or more switches and/or routers, mobile device, or any other device or devices commonly employed in host networks, local area networks (LANs), wide area networks (WANs), or similar networks. The Client devices 111-114 may enter and/or leave channel (S,G) and/or (*,G) based on whether a particular client device needs access to the data being transmitted from the source device 131 as discussed below.

Requested data may be transmitted from the source device 131 to one or more of the client devices 111-114 via NEs 101-106 and the PIM network 130. A plurality of data transmissions from a source device to a given client device may be referred to as a data stream. Data traveling from a source device to a client device may be referred to as moving in a downstream direction or downstream, while data traveling from a client device to the source device may be referred to as moving in a upstream direction or upstream. For example, data moving from source device 131 to any client device 111-114 travels downstream and data moving from any client device 111-114 to source device 131 travels upstream. NE 106 may be referred to as the FHR as NE 106 is the first router a message encounters when transmitted from the source device 131. NEs 101-104 may be referred to as LHRs as each of these NEs may be the last routers messages encounter when transmitted from the source device 131 to the client devices 111-114, respectively. The PIM network 130 may comprise any number of NEs connected in any topology. NEs 101-106 and PIM network 130 together constitute a PIM network. NEs 101-106 are shown for illustrative purposes.

As discussed above, a source 131 or sources may transmit data to one or more of the client devices 111-114. Such transmission may be accomplished by employing various routing methods, schemes, or protocols between the source 131, the FHR 106, the LHRs 101-104, and the client devices 111-114. The client devices 111-114 may communicate with the LHRs 101-104 via IGMP versions one through three and Multicast Listener Discovery (MLD) versions one and two. Transmissions between the FHR 106 and the LHRs 101-104 may be accomplished by a multicast scheme such as PIM. Multiple variants of PIM may be employed including PIM Dense Mode (PIM-DM), PIM Sparse Mode (PIM-SM), PIM Source Specific Mode (PIM-SSM), and PIM Bidirectional Mode (PIM-BIDIR), as set forth in Internet Engineering Task Force (IETF) documents request for comments (RFC) 3973, RFC 4601, RFC 3569, and RFC 5015, respectively, which are hereby incorporated by reference.

PIM-DM may presume that all downstream NEs wish to receive content transmitted by a source 131. In PIM-DM, all data transmitted from the source 131 may initially be flooded to the entire network 100. A NE may receive a prune message from the NE's upstream neighbors and may send the prune message to the NE's downstream neighbors. If no response is received to indicate that a downstream neighbor NE wishes to be a member of channel (*,G) and/or (S, G), the NE and the NE's downstream neighbors to be removed from the channel. One or more of the NE's downstream neighbors may respond with a join message, which may be forwarded to the NE's upstream neighbors to prevent the NE and the NE's downstream neighbor from being removed from the channel. If a NE has been previously removed from the channel and a downstream neighbor wishes to enter the channel, the downstream neighbor may send a graft message to the NE, which may be forwarded to the NE's upstream neighbors and may cause the NE and the NE's downstream neighbors to enter the channel. A pruned state, e.g. no membership in the channel, may timeout causing the NE and the NE's downstream neighbors to reenter the channel. Prune messages may be sent periodically to allow the NE to remain out of the channel. Such prune messages may trigger more join messages.

In PIM-SM, a LHR may send a PIM join message toward a NE designated as an RP for the channel (S,G) and/or (*, G), via any intervening NEs. A NE may be statically or dynamically designated as an RP, depending on the embodiment. All NEs must join through the RP, the RP receives data from the source, and transmits the data downstream on behalf of the source. When a join message is sent from a LHR toward the RP, the join message may reach the RP or a NE that is already a member of the channel, at which point the LHR and any intervening NEs may become members of the channel. PIM messages from the source, through the RP, may travel back to the LHR through reverse path routing. This process may create an RP multicast tree, which may be rooted at the RP. Once the RP tree reaches a predetermined size, the RP tree may be converted to a Source Path Tree (SPT), which may allow packets to be routed directly from the source's FHR to the LHR. Join messages may be periodically refreshed by the members of the channel, and membership in the channel may timeout if no join message is sent from a given NE. PIM-BIDIR may function in a substantially similar manner to PIM-SM. However, PIM-BIDIR may create a bidirectional tree between the source and the LHRs, which may pass though the RP. The bidirectional tree may not be converted to a SPT.

In PIM-SSM, a channel may be limited to a single source (S, G). A LHR wishing to join the channel may send a join message upstream to the FHR. Each NE receiving a join message my become part of channel (S, G). Join messages may be periodically refreshed by the members of the channel, and membership in the channel may timeout if no join message is received by an upstream NE.

Regardless of the version of PIM employed, a NE 101-104 may join or remain in a PIM channel by transmitting join messages upstream to a FHR connected to a source device 131 or a FHR functioning as an RP. The FHR may be NE 106 or may be a NE in PIM 130 if the source or sources are located in PIM 130. For example, source device 131 may comprise two sources S1 and S2. Alternatively, source device 131 may comprise S1 and S2 may be located in the PIM network 130. Client devices 111 and 112 may wish to receive data from S1, while 113 and 114 may wish to receive data from S2. The client devices 111-114 may each request to join their respective channels by contacting the NEs 101-104 to which each client device is attached using IGMP, MLD, or a similar protocol. NE 101 and 102 may each send a join (S1, G1) message to NE 105. NE 103 and 104 may each send a join (S2, G2) message to NE 105. NE 105 may send a join (S1, G1) message and a join (S2, G2) message toward the FHR, e.g NE 106, through the PIM network 130 and/or to a FHR in the PIM network 130. NEs 101, 102, 105, and 106 may then become or remain members of (S1, G1) and NEs 103, 104, 105, and 106 may become or remain members of (S2, G2), where S1 is the IP address of source 1, S2 is the IP address of source 2, G1 is the group of network elements receiving data from S1, and G2 is the group of network elements receiving data from S2.

Each NE 101-106 may comprise a multicast forwarding information base (MFIB), which may store the NEs PIM group status by making data entries related to all incoming and outgoing PIM join messages. Each NEs MFIB may also indicate whether the NE should receive data packets from an upstream NE and replicate the data packets to be sent to multiple downstream NEs or forward the received data packets without replication.

Figure 2:
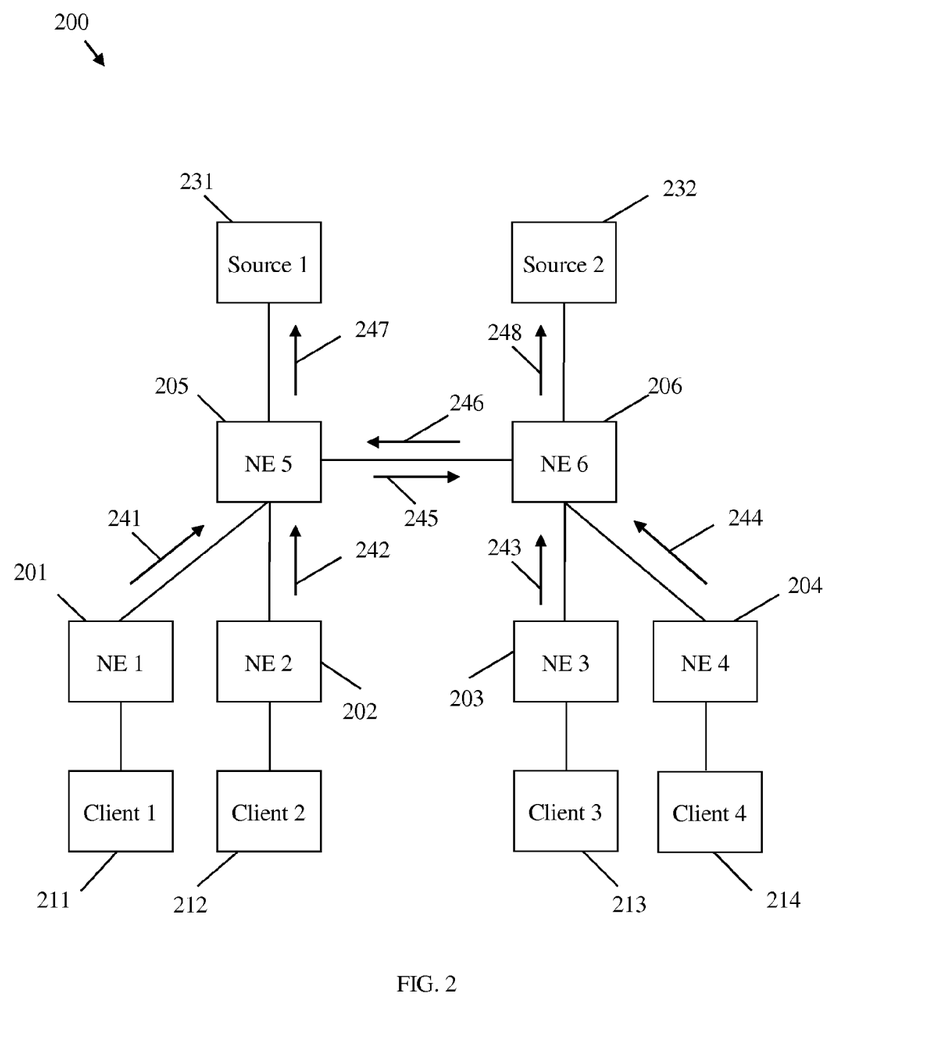
FIG. 2 is a schematic diagram of an embodiment of a network with NEs capable of employing PIM to transmit QoS data.

FIG. 2 is a schematic diagram of an embodiment of a network 200 capable of employing PIM to transmit QoS data. The network 200 may comprise substantially the same components of network 100, but in a different configuration and with one additional source device. As shown in FIG. 2, clients 211-214 may be connected to NEs 201-204, respectively; NEs 201 and 202 may be connected to NE 205; NEs 203 and 204 may be connected to NE 206; NE 205 may be connected to NE 206 and a first source device 231; and NE 206 may also be connected to a second source device 232. NEs 201-204 may be considered LHRs and NEs 205 and 206 may be considered FHRs. The characteristics of network 200 described here apply to a network with any number of source devices, NEs, and client devices.

Network 200 may provide for QoS provisioning. When a NE receives a downstream data packet transmitted over a channel, the NE may receive the packet over an incoming interface, process the packet according to the MFIB including performing any packet replication, and transmit the packet and/or replicated packets over an outgoing interface. The packet(s) may be placed in various buffers and queued for processing and for transmission. If the NE receives more packets than the NE is capable of processing and transmitting, the NEs buffers may run out of space, which may prevent new packets from being stored and may lead to packets being dropped. QoS provisioning may allow a NE to allocate buffer space or other resources for a particular channel. QoS provisioning may also allow a NE to guarantee a particular channel greater queue priority or bandwidth. QoS data may be any data used by the network 200 to perform QoS provisioning and may include, without limitation: maximum bandwidth, minimum bandwidth, maximum packet size, maximum latency, and user defined parameters such as scheduling priority and egress queue depth for downstream packet forwarding and/or replication. A NE 201-206 may consider any QoS data received in performing QoS provisioning. In an embodiment, the NEs 201-206 may consider accumulated latency over multiple hops and/or perform multicast traffic shaping using a leaky bucket algorithm in conjunction with maximum and minimum bandwidth requests.

Clients 211 and 213 may wish to receive data from channel (S1, G1) and clients 212 and 214 may wish to receive data from channel (S2, G2), where S1 is source device 131 and S2 is source device 132. Clients 211-214 may each wish to request QoS provisioning for the data transmitted to them across an associated channel. Each client 211-214 may send QoS data to the NE 201-204, respectively, using IGMP and/or MLD as discussed below. The LHRs 201-204 may accept the QoS data from clients 211-214, process the QoS data, and transmit the QoS data upstream as part of PIM join messages 241-244. Processing the QoS data may involve determining if local QoS provisioning is possible given current local resources and performing local QoS provisioning. PIM join messages 241 and 243 may indicate that clients attached to NEs 201 and 203 wish to join channel (S1, G1) and include the QoS requirements of clients 211 and 213, respectively. Likewise, PIM join messages 242 and 244 may indicate that clients attached to NEs 202 and 204 wish to join channel (S2, G2) and include the QoS requirements of clients 212 and 214, respectively.

NE 205 may receive join messages 241 and 242, and NE 206 may receive join messages 243 and 244. As NE 205 and NE 206 may both be attached to downstream clients that wish to join both channels (S1, G1) and (S2, G2), NEs 205 and 206 may both send requests to join both channels. NE 205 may send join message 245 to NE 206 as NE 206 is upstream from NE 205 with respect to source device 232 for channel (S2, G2) Likewise, NE 206 may send join message 246 to NE 205 as NE 205 is upstream from NE 206 with respect to source device 231 for channel (S1, G1). Join message 246 may carry QoS data from NE 203, and join message 245 may carry QoS data from NE 202. At this point, NE 205 may have received join message 246 from NE 203/206 and join message 241 from NE 201. In order to perform QoS provisioning, NE 205 may select the QoS with the most stringent requirements to ensure that QoS provisioning is sufficient for all requesting NEs. For example, if join message 241 contains the most stringent QoS requirements, NE 205 may provision based on the QoS information received in 241 and send a join message 247 to source device 231 with QoS information based on the QoS information received in 241. Likewise, NE 206 may have received join messages 244 and 245 from NEs 202/205 and 204, respectively. If join message 245 comprises the most stringent QoS requirements, NE 206 may send a join message 248 to source device 232 with QoS information based on the QoS information received in 245. This process may result in multicast trees for (S1, G1) and (S2, G2), wherein G1 equals NE 201, 203, and 205-206, wherein G2 equals 202 and 204-206, S1 equals source device 131, and S2 equals source device 132. This process may also result in QoS provisioning for all client devices 211-214. The provisioned QoS resources may later be released if the client device(s) requiring QoS wish to leave a channel.

PIM QoS provisioning may be implemented in each version of PIM (e.g PIM-SM, PIM-DM, PIM-SSM, and PIM-BIDIR). As PIM-SSM may comprise a single source QoS provisioning may be implemented by placing the QoS data in the PIM join message during multicast tree creation and sending the PIM join message across the multicast tree toward the source address. PIM-SM may have two general embodiments as PIM-SM creates an RP tree and a SPT, which may comprise different root locations. In the first embodiment, the RP may be considered the source address as long as the RP tree is in use. Once RP tree is converted to a SPT, the source may be considered the source address, which may require that the QoS information be refreshed for the SPT. In the second embodiment, the network may only perform QoS provisioning once the source tree is created. PIM-BIDIR may require the PIM join message be forwarded past the RP to the FHR connected to the source. PIM-DM may require that the join message with QoS data be forwarded to the FHR in response to a prune message. Also, in PIM-SM, PIM-BIDIR, and PIM-DM, QoS provisioning to multiple FHRs may be required in cases where more than one source is in use, e.g. the scenario denoted by (*, G).

Figure 3:
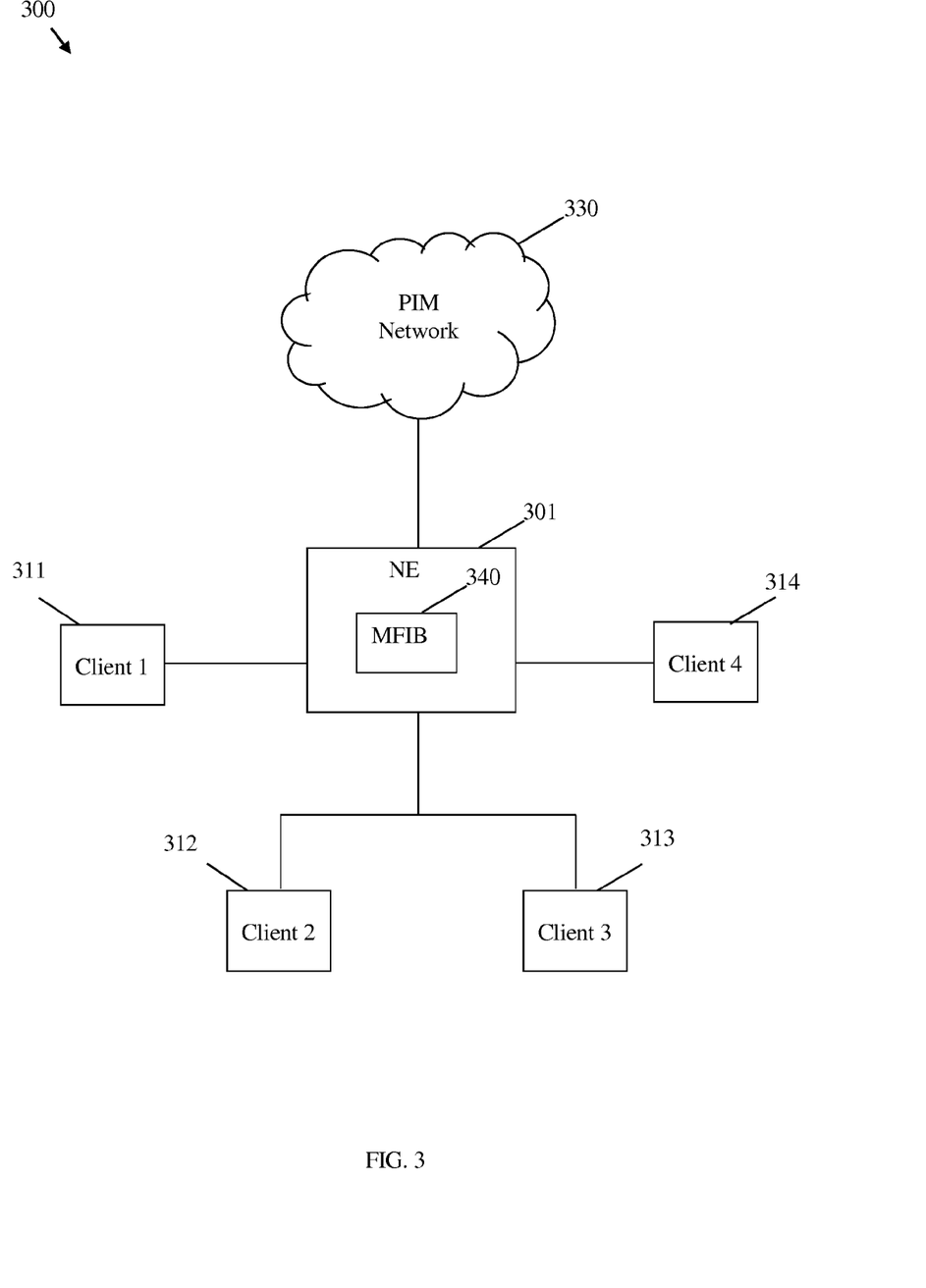
FIG. 3 is a schematic diagram of an embodiment of a network with Network Elements (NEs) capable of transmitting multicast channel membership query report messages with QoS data.

FIG. 3 is a schematic diagram of an embodiment of a network 300 with NEs capable of transmitting a multicast channel membership query report messages with QoS data. The network 300 may comprise components that are substantially similar to the components of networks 100-200 in a different configuration. Client devices 311-314 may be connected to NE 301 which may comprise a MFIB 340. The MFIB 340 may be a routing table or similar data structure which may be used by the NE 301 to map the NEs 301 incoming communication interfaces to the NEs 301 outgoing communication interfaces, determine which incoming packets should be replicated for transmission on an outgoing interface, and to determine which incoming packets and/or replicated packets should be sent to one or more outgoing interfaces for transmission. The NE 301 may be connected to the PIM network 330. The characteristics of network 300 described here apply to a network with any number of NEs and client devices.

The NE 301 may periodically send a query to each client device 311-314 to determine which multicast channels each client device 311-314 wishes to receive communications from. The query may be a multicast channel membership query and may be sent using IGMP versions one, two, and/or three, MLD version one and/or two, or similar protocols. Each client device 311-314 may respond by sending a multicast channel membership query report which may comprise data indicating each multicast channel from which the client devices wishes to receive communications and related requested QoS information. Alternatively, the client devices 311-314 may send an unsolicited channel membership report. The multicast channel membership query report may comprise a group record for each multicast channel. Each group record may comprise an auxiliary data field which may comprise the related QoS information. Upon receive the channel membership reports from the client devices 311-314, the NE 301 may populate and/or update the MFIB 340 based on the data from the channel membership query report. The NE 301 may provision local resources for each multicast channel requested by the client devices 311-314 and/or provision local resources for each client device 311-314. The NE 301 may also release any resources that were previously allocated for a communication or communications if the channel membership report indicates that a client device or all client devices no longer wish to receive the communication. The NE 301 may create a PIM join message with QoS information for the channels requested by the client devices 311-314 and transmit the PIM join message toward a PIM source, RP, or related FHR in the PIM network 330 via an upstream network element.

As a specific example, NE 301 may comprise three downstream interfaces E1-E3 and one upstream interface E0. Client device 311 may be connected to interface 311, client devices 312 and 313 may be connected to interface E3, and client device 314 may be connected to interface E2. Client devices 311 and 312 may wish to join channel (S1,G1) and may each require bandwidth B1, while client devices 313 and 314 may wish to join channel (S2,G2) and may each require bandwidth B2. Each client device may send data indicating each membership request via the channel membership report. NE 301 may process the channel membership reports and update the MFIB 340 to indicate that communications from (S1,G1) coming from interface E0 should be sent to interfaces E1 and E3 with provisioned bandwidth of B1. The MFIB may also indicate that communications from (S2,G2) coming from interface E0 should be sent to interfaces E2 and E3 with provisioned bandwidth of B2. The preceding example is presented for the purposes of clarity and should not be considered to limit network 300 as described hereinabove.

The QoS information may comprise, for example, a minimum bandwidth, a maximum bandwidth, a maximum packet size, a maximum latency, and/or user defined parameters. If a NE receives differing QoS information of the same type from a plurality of connected downstream components, such as client devices or PIM NEs, the NE may select QoS information from one of the components for inclusion in an upstream PIM QoS request. The NE may select the largest QoS data for minimum bandwidth, maximum bandwidth, and maximum packet size and the smallest QoS information for maximum latency. For user defined parameters, the NEs selection may be specific to the application. Generally, the NE may select the more stringent of the requirements in the two QoS information sets to ensure the NE has sufficiently provisioned for the component with the most demanding requirements.

Figure 4:
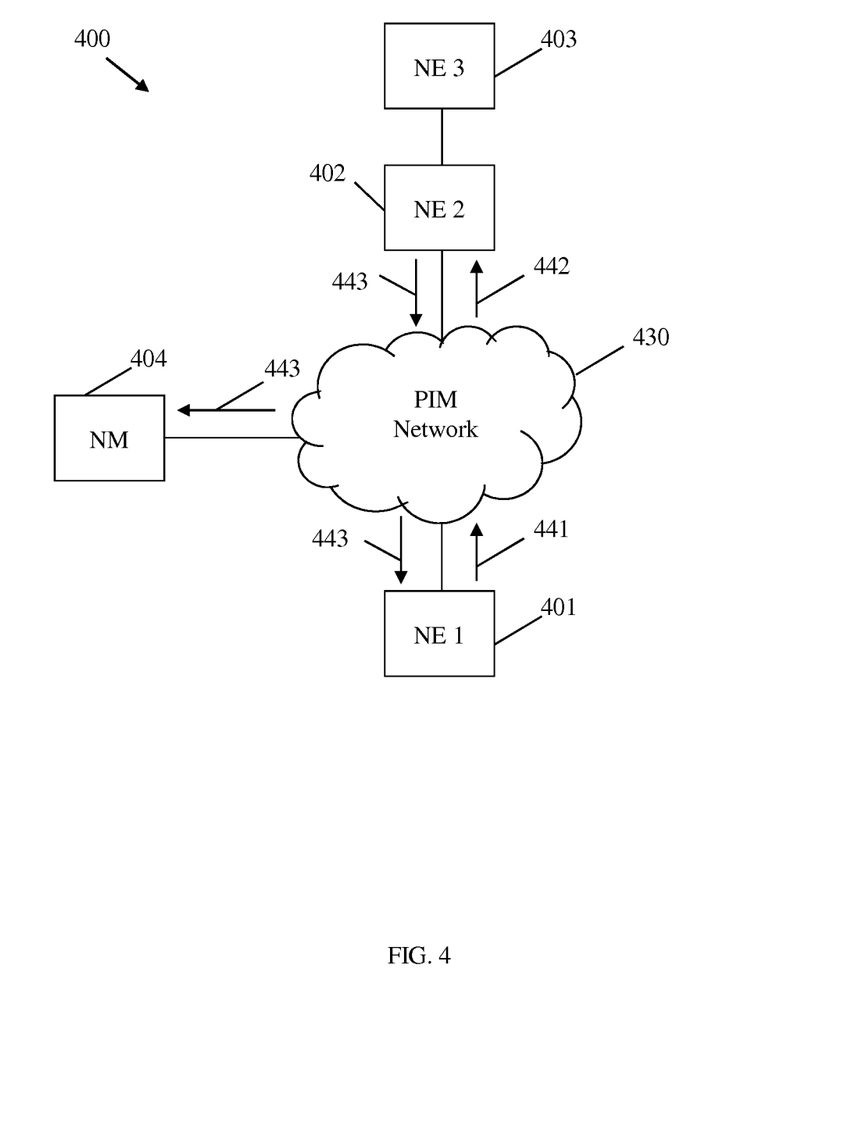
FIG. 4 is a schematic diagram of an embodiment of a network with NEs capable of transmitting PIM QoS fail messages.

FIG. 4 is a schematic diagram of an embodiment of a network 400 with NEs capable of transmitting PIM QoS fail messages. Network 400 may comprise substantially the same components as networks 100, 200, and/or 300 in a different configuration and may also comprise a network management device 404. NE 401 may be connected to NE 403 via PIM network 430 and NE 402. NEs 401-403 may also be connected to the network management device 404 via the PIM network 430. The network management device 404 may be any NE or connected device tasked with managing overall network traffic or reporting network traffic status to network administrators.

A QoS reservation may fail at a NE because of insufficient resources to meet QoS provisioning requirements or because an upstream NE is not QoS capable. Network 400 may comprise components capable of handling QoS reservation failures. NE 401 may transmit a join message 441 with QoS data to NE 402 through the PIM network 430. Join 441 may pass though one or more NEs in the PIM network 430 and may exit the PIM network 430 as join 442, which may include more stringent QoS data from another NE wishing to join the channel. NE 402 may fail to provision QoS resources due to insufficient resources or because NE 402 is aware that upstream NE 403 is not PIM QoS capable. NE 402 may send a PIM QoS fail message 443 back to NE 401 indicating the failure and the reason for the failure. Alternatively, NE 402 may send a PIM QoS fail message 443 to all downstream LHRs, or all downstream LHRs on a given channel. Additionally or alternatively, the NE 402 may send a PIM QoS fail message 443 to the network management device 404. If the QoS failure was caused by an upstream router without PIM QoS capability, NE 403 may send a PIM join message to NE 403 with or without the QoS data. If the QoS failure was caused by insufficient local resources, depending on the embodiment of network 400, NE 402 may discard the PIM join message 442 or send a PIM join message to NE 403 indicating a QoS failure. Upon receiving a QoS fail message, a NE 401-403 may release any QoS resources that were related to the unsuccessful QoS request.

Figure 5:
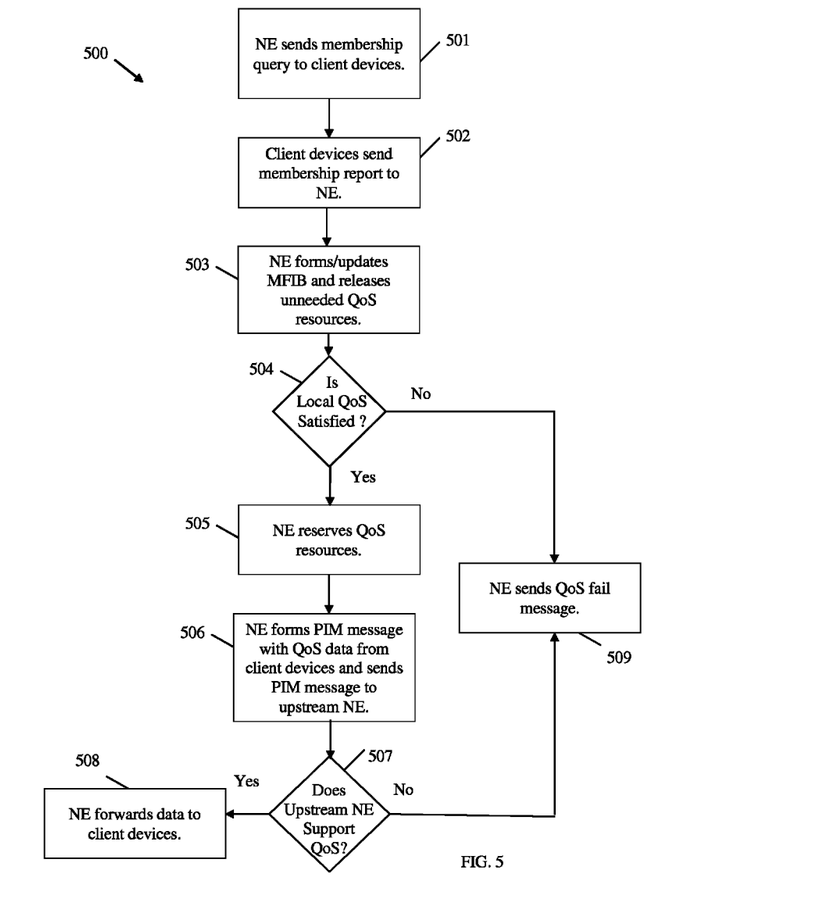
FIG. 5 is a flowchart of an embodiment of a QoS provisioning method.

FIG. 5 is a flowchart of an embodiment of a QoS provisioning method 500 which may be used in conjunction with network employing PIM with QoS or IGMP/MLD with QoS such as networks 100-400. In step 501, a NE may send an IGMP and/or MLD membership query message to one or more client devices. The membership query may request that each client device send a multicast channel membership report message using IGMP and/or MLD. In step 502, each client device may send a responsive IGMP/MLD membership query report message to the NE indicating the channels that the client device wishes to access and related QoS constraints. The membership query report message may not be contingent on a related membership query message in all cases. In step 503, the NE may receive the report, process the information, and form and/or update the NE's MFIB with the data from the report. Also in step 503, if a client device or all client devices no longer wish to access a particular channel, the NE may release any previously provisioned QoS resources. The NE may also release resources if the NE determines that a related link has failed. In decision block 504, the NE may review the QoS data in the membership reports and determine if the NE has sufficient available local resources to provision QoS for each of the client devices. The NE may proceed to step 509 if local resources are insufficient and step 505 if local resources are sufficient. If local resources are insufficient, in step 509 the NE may send a QoS fail message to the requesting client device, all connected client devices, and/or to a network management device. If the local resources are sufficient, in step 505 the NE may reserve QoS resources for each of the client devices. In step 506, the NE may also form a PIM message with the QoS data from the client devices and send the PIM message to an upstream router for PIM QoS provisioning. At decision block 507, the NE may proceed to step 508 if upstream QoS provisioning is successful and step 509 if upstream QoS provisioning is not successful. If upstream QoS provisioning between a source and the client device succeeds is successful, in step 508 the source may forward data to the NE to be forwarded to the client devices. If upstream QoS provisioning between source and client device is unsuccessful, the NE may receive a PIM QoS fail message and, in step 509, forward the PIM QoS fail message to the client device, client devices, and/or the network management device.

Figure 6:
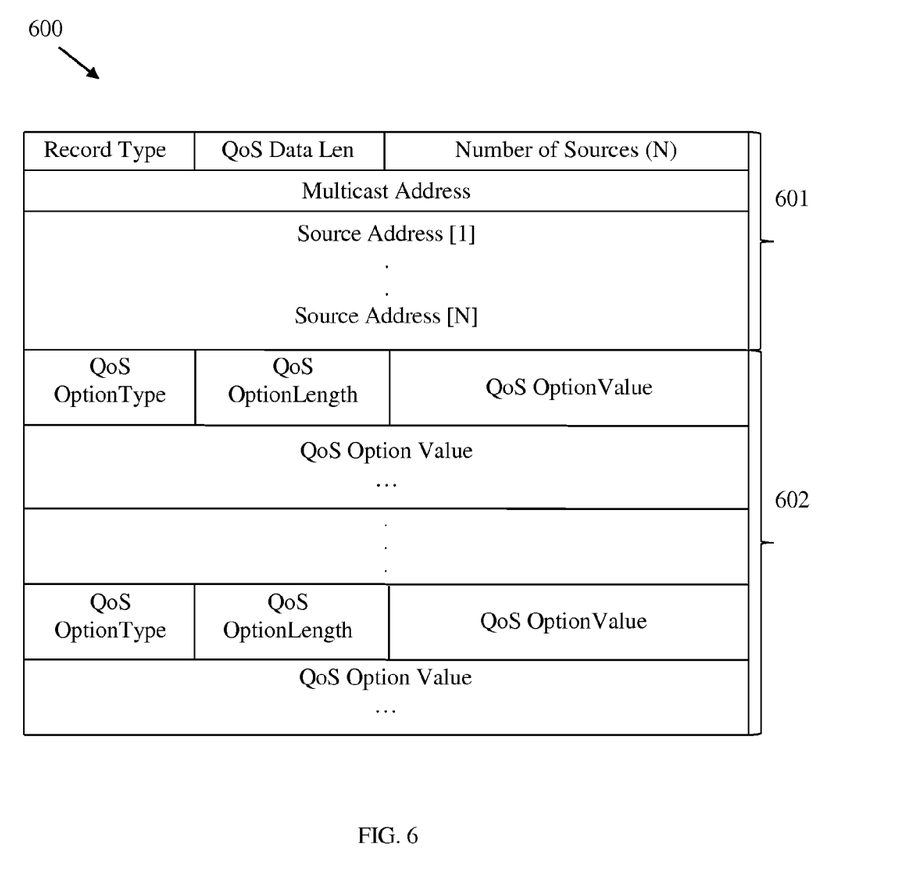
FIG. 6 illustrates an embodiment of an encoding for a multicast channel membership query report message with QoS data.

FIG. 6 illustrates an embodiment of an encoding for a multicast channel membership query report message 600 with QoS data. The message 600 may be an MLD membership query report message and/or a IGMP membership query report message as set forth in IETF RFC 3810 and IETF RFC 3376, respectively, which are hereby incorporated by reference. The report message 600 may comprise a plurality of fields arranged in successive thirty two bit sections, each section numbered from bit position zero to bit position thirty one. The report message 600 may comprise a multicast channel section 601. The multicast channel section 601 may comprise a Record Type field which may be eight bits long, may extend from bit position zero to bit position seven, and may comprise data indicating the message 600 comprises a multicast channel membership query report message. The multicast channel section 601 may comprise a QoS Data Length field which may be eight bits long, may extend from bit position eight to bit position fifteen, and may comprise data indicating the length of the message 600. The multicast channel section 601 may comprise a Number of Sources field which may be sixteen bits long, may extend from bit position sixteen to bit position thirty one, and may comprise data indicating a number of Sources Address fields located in the multicast channel section 601 as discussed below. The multicast channel section 601 may comprise a Multicast Address field which may be thirty two bits long, may extend from bit position zero to bit position thirty one, and may comprise data indicating the multicast address of a channel. The multicast channel section 601 may comprise at least one Source Address field each of which may be thirty two bits long, may extend from bit position zero to bit position thirty one, and may comprise data indicating the network addresses of sources associated with the channel. The message 600 may further comprise an Auxiliary Data Section 602, which may comprise the QoS constraints the entity transmitting the report message 600 has requested. The Auxiliary Data Section 602 may comprise one or more QoS parameters. Each QoS parameter may comprise a QoS Option Type field, a QoS Option Length field, and a QoS Option Value field. The QoS Option Type field may be eight bits long, may extend from bit position zero to bit position seven, and may comprise data indicating the type of QoS option that the parameter comprises, including minimum bandwidth, maximum bandwidth, maximum packet size, maximum latency, and user defined parameters such as queue type or scheduling priority. For example, the QoS Option Type field may be set to a value of one to indicate a minimum bandwidth parameter, a value of two to indicate a maximum bandwidth parameter, a value of three to indicate a maximum packet size parameter, a value of four to indicate a maximum latency parameter, and a value of five to indicate a user defined parameter such as queue type or scheduling priority. The QoS Option Length field may be eight bits long, may extend from bit position eight to bit position fifteen, and may comprise data indicating the length of the QoS parameter. The QoS Option value field may be of variable length, may extend from bit position sixteen to bit position thirty one and may extend to additional thirty two bit segments as needed. The QoS Option value field may comprise data indicating value of the QoS parameter.

Figure 7:
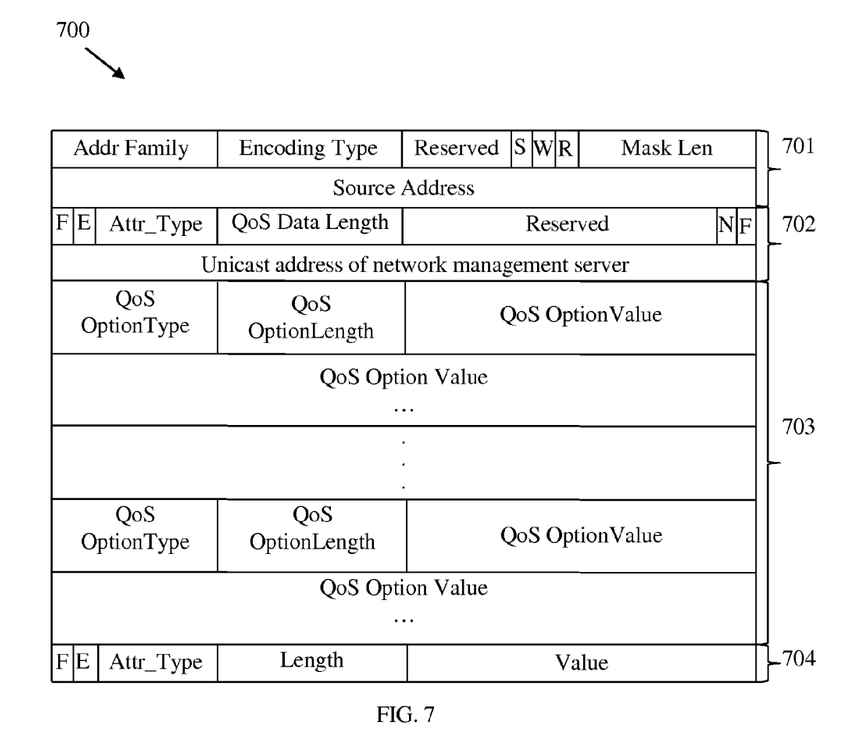
FIG. 7 illustrates an embodiment of an encoding for a PIM QoS join message.

FIG. 7 illustrates an embodiment of an encoding for a PIM QoS join message 700. The join message 700 may comprise a plurality of fields in successive thirty two bit sections, each section being numbered from bit position zero to bit position thirty one. The join message 700 may comprise a PIM join header 701, which may be encoded substantially as set forth in IETF documents RFC 5384 and RFC 4601, which are hereby incorporated by reference, and may indicate that the message 700 is a PIM join message.

The join message 700 may comprise a QoS attribute 702, which may indicate that the join message carries PIM QoS data. The QoS attribute 702 may comprise an F bit and an E bit in bit positions zero and one as disclosed in RFC 5384. The QoS attribute 702 may comprise an Attr_Type field which may be six bits long, may extend from bit position two to bit position seven, and may comprise data indicating the attribute 702 is a QoS attribute. The Attr_Type filed may be set to a value of two. The QoS attribute 702 may comprise a QoS data length field which may be eight bits long, may extend from bit position eight to bit position sixteen, and may comprise data indicating the length of the QoS attribute 702 and related QoS data 703. The QoS attribute 702 may comprise a reserved field which may be fourteen bits long, may extend from bit position sixteen to bit position twenty nine. The QoS attribute 702 may comprise an N flag and an F flag, which may be located at bit positions thirty and thirty one, respectively. The N flag may be set to indicate a PIM QoS failure message should be sent in case of a PIM QoS failure. The F flag may be cleared to indicate that the join message 700 may not be forwarded to an upstream NE if QoS provisioning has failed locally. The QoS attribute 702 may comprise a Unicast Address of Network Management Server field which may be thirty two bits long, may extend from bit position zero to bit position thirty one, and may comprise data indicating the address of the entity that may be notified in the event of a PIM QoS failure (e.g. a network management server or a LHR).

The join message 700 may further comprise QoS data 703, which may indicate the QoS constraints the entity transmitting the join message 700 has requested. The QoS data 703 may comprise one or more QoS parameters. Each QoS parameter may comprise a QoS Option Type field, a QoS Option Length field, and a QoS Option Value field. The QoS Option Type field may be eight bits long, may extend from bit position zero to bit position seven, and may comprise data indicating the type of QoS option that the parameter comprises. The QoS Option Type field may indicate one of a plurality of QoS options, including minimum bandwidth, maximum bandwidth, maximum packet size, maximum latency, and user defined. For example, the QoS Option Type field may be set to one to indicate a minimum bandwidth parameter, two to indicate a maximum bandwidth parameter, three to indicate a maximum packet size parameter, four to indicate a maximum latency parameter, and five to indicate a user defined parameter such as queue type or scheduling priority. The QoS Option Length field may be eight bits long, may extend from bit position eight to bit position fifteen, and may comprise data indicating the length of the QoS parameter. The QoS Option value field may be of variable length, may extend from bit position sixteen to bit position thirty one and may extend to additional thirty two bit segments as needed. The QoS Option value field may comprise data indicating value of the QoS parameter. The join message 700 may further comprise additional PIM attributes 704 as set forth in IETF RFC 5384.

Figure 8:
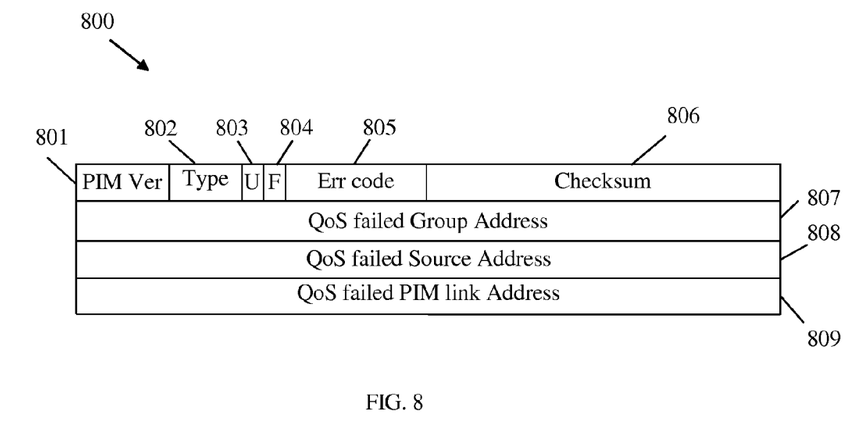
FIG. 8 illustrates an embodiment of an encoding for a PIM QoS fail message.

FIG. 8 illustrates an embodiment of an encoding for a PIM QoS fail message 800. The fail message 800 may comprise a plurality of fields in successive thirty two bit sections, each section being numbered from bit position zero to bit position thirty one. The fail message 800 may comprise a PIM Version field 801 which may be four bits long, may extend from bit position zero to bit position three, and may indicate the version of PIM used by the network. The PIM Version field 801 may be set to a value of two. The fail message 800 may comprise a Type field 802 which may be four bits long, may extend from bit position four to bit position seven, and may indicate that the message 800 is a fail message. The Type field 802 may be set to a value of nine. The fail message 800 may comprise a U bit 803 and an F bit 804 at positions eight and nine, respectively. The U 803 bit may be set to indicate that the failure occurred on the uplink and cleared to indicate failure occurred on the downlink. The F 804 bit may be set to indicate that the message 800 is sent in response to a failure and cleared to indicate that the message 800 is being sent in response to a previous failure that has now been corrected. The fail message 800 may comprise an Error Code field 805 which may be six bits long, may extend from bit position ten to bit position fifteen, and may indicate type of QoS failure that has occurred. The Error Code field 805 may be set to a value of one to indicate a minimum bandwidth reservation failure, two to indicate a maximum bandwidth reservation failure, three to indicate a maximum packet size reservation cannot be satisfied, four to indicate requested latency cannot be satisfied, and five to indicate a user defined QoS parameter failure. The fail message 800 may comprise a Checksum field 806 which may be sixteen bits long, may extend from bit position fifteen to bit position thirty one, and may be used for transmission error checking. The fail message 800 may comprise a QoS Failed Group Address field 807 which may be thirty two bits long and may extend from bit position zero to bit position thirty one. The fail message 800 may comprise a QoS Failed Source Address field 808 which may be thirty two bits long and may extend from bit position zero to bit position thirty one. The QoS Failed Group Address field 807 and the QoS Failed Source Address field 808 may be used to indicate the PIM channel and/or (*, G) associated with the failure. The group number of the PIM channel may be encoded in the QoS Failed Group Address field 807, and the source of the PIM channel may be encoded in the QoS Failed Source Address field 808. The fail message 800 may further comprise a QoS Failed PIM Link Address field 809 which may be thirty two bits long, may extend from bit position zero to bit position thirty one, and may indicate the link address of the QoS failure. If the failure occurred because of insufficient local resources, the Failed PIM Link Address field 809 may indicate address of the NE's downstream link. If the failure occurred because an upstream NE is not PIM QoS capable, the Failed PIM Link Address field 809 may indicate the address of the NE's upstream link.

Figure 9:
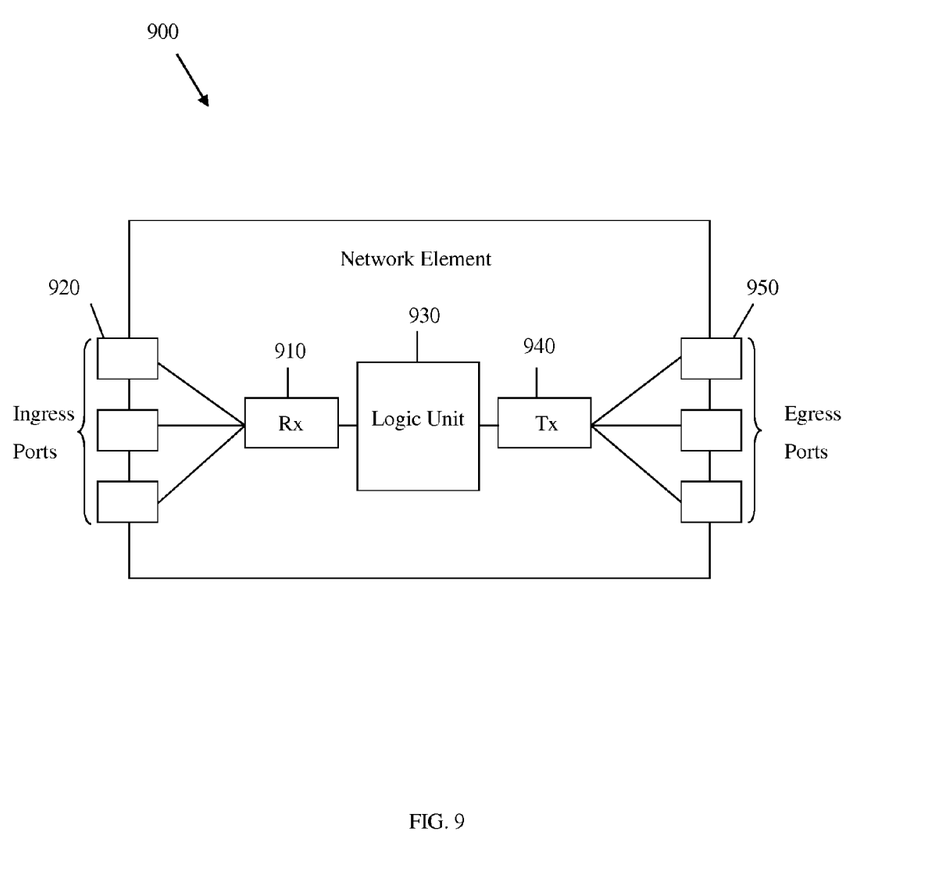
FIG. 9 is a schematic diagram of an embodiment of a NE.

FIG. 9 illustrates an embodiment of a network element 900, which may comprise a processor or a transceiver as described above, e.g., within a network or system. The network element 900 may comprise a plurality of ingress ports 920 and/or receiver units 910 for receiving data, logic unit or processor 930 to process signals and determine where to send the data to, and a plurality of egress ports 950 and/or transmitter units 940 for transmitting data to other systems. The logic unit 930 may comprise a plurality of ingress buffers and a plurality of egress buffers for storing received communications prior to processing and prior to transmission to other systems. The logic unit or processor 930 may be configured to implement any of the schemes described herein, such as the QoS provisioning method 500, and may be implemented using hardware, software, or both. For example, the network element 900 may be any NE in a network that implements PIM with QoS or IGMP/MLD with QoS as described herein, such as illustrative networks 100-400.

Figure 10:
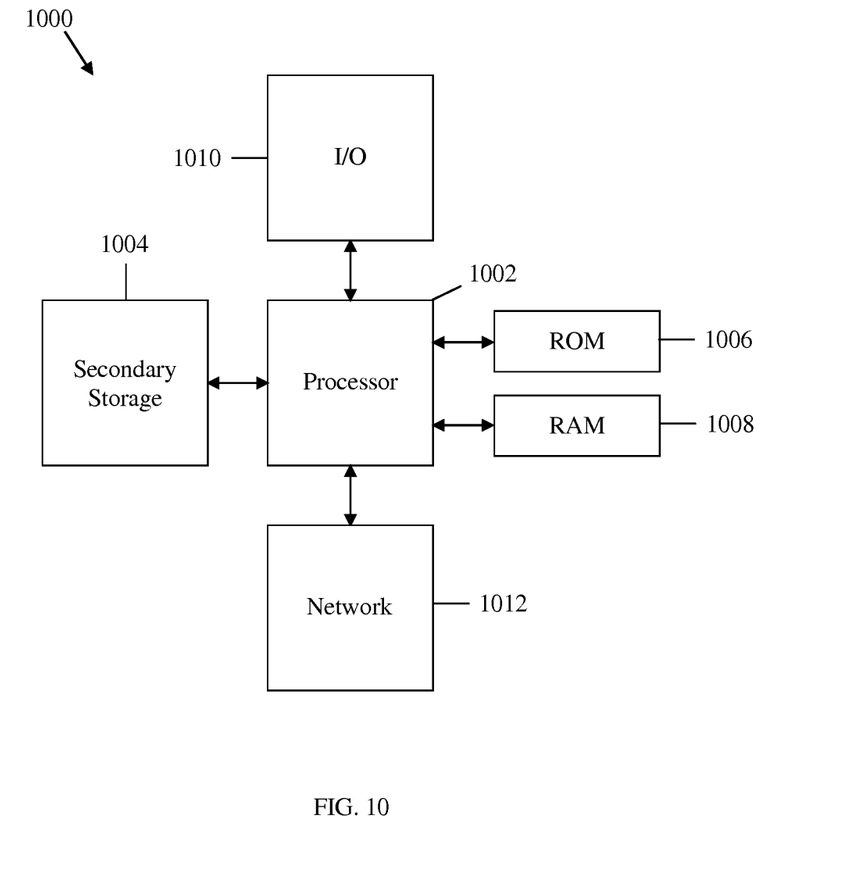
FIG. 10 is a schematic diagram of an embodiment of a general-purpose computer system.

The schemes described above may be implemented on any general-purpose network component, such as a computer or network component with sufficient processing power, memory resources, and network throughput capability to handle the necessary workload placed upon it. FIG. 10 illustrates a typical, general-purpose network component or computer system 1000 suitable for implementing one or more embodiments of the methods disclosed herein, such as the QoS provisioning method 500. The general-purpose network component or computer system 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, one or more cores (e.g., a multi-core processor), or may be part of one or more application specific integrated circuits (ASICs) and/or digital signal processors (DSPs). The processor 1002 may be configured to implement any of the schemes described herein, including the QoS provisioning method 500, which may be implemented using hardware, software, or both. For example, the processor 1002 may include or be coupled to a computer-readable medium, which may be programmed to control the functions of any NE, component, or device in networks 100-400.

The secondary storage 1004 is typically comprised of one or more disk drives or tape drives and is used for non-volatile storage of data and as an over-flow data storage device if RAM 1008 is not large enough to hold all working data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   receiving, by a protocol independent multicast (PIM) enabled network element (NE), a multicast channel membership query report from a non-PIM enabled client that comprises a quality of service (QoS) provisioned multicast channel request and associated QoS data from the non-PIM enabled client;
   reserving at least some hardware resources of the PIM enabled NE based on the non-PIM enabled client QoS data to support communication of multicast data via a QoS provisioned multicast channel requested by the QoS provisioned multicast channel request; and
   forward a PIM join message to an upstream NE to establish a connection to the QoS provisioned multicast channel across a PIM network,
   wherein the PIM join message comprises PIM enabled NE QoS data based on the non-PIM enabled client QoS data.

2. The method of claim 1, wherein the non-PIM enabled client QoS data comprises at least one data type taken from the group consisting essentially of: minimum bandwidth, maximum bandwidth, maximum packet size, maximum latency, queue depth, priority, and platform dependent parameters.

3. The method of claim 1, wherein the multicast channel membership query report comprises a designation of the QoS provisioned multicast channel from which the client wishes to receive communications.

4. The method of claim 3, wherein the multicast channel membership query report is an Internet Group Management Protocol version three (IGMPv3) membership query report or a Multicast Listener Discovery version two (MLDv2) membership query report.

5. The method of claim 1, wherein the multicast channel membership query report comprises a type length value (TLV),
   wherein the TLV comprises at least one QoS option,
   wherein the non-PIM enabled client QoS data is encoded in the QoS option, and
   wherein each QoS option comprises:
     a QoS Option Value Field that comprises data indicating at least one value taken from the group of Minimum Bandwidth, Maximum Bandwidth, Maximum Packet Size, Maximum Latency, and Queue Type;
     a QoS Option Type Field that indicates a type of value contained in the QoS Option Value Field; and
     a QoS Option Length Field that indicates a length of the QoS option.

6. The method of claim 5, wherein the TLV further comprises:
- a Record Type field that comprises data indicating a type of data in the TLV;
- a QoS Data Length field that comprises data indicating a length of the TLV;
- at least one Source Address field that comprises data indicating a network address of a multicast source;
- a Number of Sources field that comprises data indicating a number of Source Address fields in the TLV; and
- a Multicast Address field that comprises data indicating an interne protocol (IP) multicast address associated with a multicast channel from which the client wishes to receive communications.

7. The method of claim 1, wherein the PIM network is a PIM dense mode (PIM-DM) network.

8. An apparatus comprising:
- a protocol independent multicast (PIM) enabled network element (NE) comprising:
  - a downstream interface configured to couple to a non-PIM enabled client;
  - an upstream interface configured to couple to a PIM network comprising a plurality of other PIM enabled network elements; and
  - a processor coupled to the upstream interface and the downstream interface and configured to cause the PIM enabled NE to:
    - receive a first multicast channel membership query report from the non-PIM enabled client via the downstream interface, the first multicast channel membership query report comprising an indication that the non-PIM enabled client wishes to receive a multicast channel communication and comprising quality of service (QoS) data from the non-PIM enabled client indicating constraints on the multicast channel communication; and
    - allocate at least some communication resources of the PIM enabled NE based on the non-PIM enabled client QoS data to the multicast channel communication via a QoS provisioned multicast channel.

9. The apparatus of claim 8, wherein the QoS data comprises at least one data type taken from the group consisting essentially of: minimum bandwidth, maximum bandwidth, maximum packet size, maximum latency, queue depth, priority, and platform dependent parameters.

10. The apparatus of claim 8, wherein the processor is further configured to cause the PIM enabled NE to send a PIM join message to the PIM network via the upstream interface to establish a connection to a QoS provisioned multicast channel for the multicast channel communication, and wherein the PIM join message comprises PIM enabled NE QoS data based on the non-PIM enabled client QoS data.

11. The apparatus of claim 10, wherein the upstream interface is further configured to receive a PIM QoS failure message from the PIM network, and wherein the processor is further configured to cause the PIM enabled NE to send a communication indicating the PIM QoS failure to a network management device separate from the PIM enabled NE.

12. The apparatus of claim 8, further comprising a memory coupled to the processor and configured to store a multicast forwarding information base (MFIB), wherein the processor is further configured to cause the PIM enabled NE to update the MFIB with data from the first multicast channel membership query report.

13. The apparatus of claim 12, wherein the downstream interface is further configured to receive a second multicast channel membership report indicating the client does not wish to receive the multicast channel communication, wherein the processor is further configured to cause the PIM enabled NE to:
- release the allocation of the communication resources; and
- update the MFIB based on the second multicast channel membership query report.

14. The apparatus of claim 8, wherein the processor is further configured to cause the PIM enabled NE to release the allocation of the communication resources in response to a failure of a logical link.

15. The apparatus of claim 8, wherein the processor is further configured to cause the PIM enabled NE to send a request for a multicast channel membership query report to the client via the downstream interface.

16. The apparatus of claim 8, wherein the PIM enabled NE is configured to establish a QoS provisioned multicast channel over a PIM dense mode (PIM-DM) network.

17. An apparatus comprising:
- a non-protocol independent multicast (PIM) enabled client comprising:
  - an upstream interface configured to couple to a PIM network via a PIM enabled network element(NE); and
  - a processor coupled to the upstream interface and configured to cause the non-PIM enabled client to send, to the PIM network, a multicast channel membership report comprising a quality of service (QoS) provisioned multicast channel request and QoS data indicating requested communication constraints associated with a multicast channel communication across the QoS provisioned multicast channel.

18. The apparatus of claim 17, wherein the non-PIM enabled QoS data indicates a request that the PIM network guarantee a minimum QoS for a multicast channel communication between the client and a multicast source via the PIM network and via a link between the client and the PIM enabled NE.

19. The apparatus of claim 18, wherein the multicast channel membership report is an Internet Group Management Protocol version three (IGMPv3) membership report as set forth in Internet Engineering Task Force (IETF) Request for Comment (RFC) 3376 or a Multicast Listener Discovery version two (MLDv2) report as set forth in IETF RFC 3810.

20. The apparatus of claim 17, wherein the PIM network is a PIM dense mode (PIM-DM) network.

* * * * *

UNITED STATES PATENT AND TRADEMARK OFFICE
CERTIFICATE OF CORRECTION

PATENT NO. : 9,036,462 B2
APPLICATION NO. : 13/531256
DATED : May 19, 2015
INVENTOR(S) : Lin Han and Renwei Li

It is certified that error appears in the above-identified patent and that said Letters Patent is hereby corrected as shown below:

In the claims:

Column 15, Lines 1-14, Claim 6, should read as:

6. The method of claim 5, wherein the TLV further comprises:
   a Record Type field that comprises data indicating a type of data in the TLV;
   a QoS Data Length field that comprises data indicating a length of the TLV;
   at least one Source Address field that comprises data indicating a network address of a multicast source;
   a Number of Sources field that comprises data indicating a number of Source Address fields in the TLV; and
   a Multicast Address field that comprises data indicating an internet protocol (IP) multicast address associated with a multicast channel from which the client wishes to receive communications.

Signed and Sealed this
Fifth Day of January, 2016

Michelle K. Lee
*Director of the United States Patent and Trademark Office*